United States Patent
Sakaue

(10) Patent No.: US 11,689,347 B2
(45) Date of Patent: Jun. 27, 2023

(54) COMMUNICATION APPARATUS, COMMUNICATION SYSTEM, COMMUNICATION METHOD, AND COMPUTER READABLE MEDIUM

(71) Applicant: MITSUBISHI ELECTRIC CORPORATION, Tokyo (JP)

(72) Inventor: Taichi Sakaue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 172 days.

(21) Appl. No.: 17/159,894

(22) Filed: Jan. 27, 2021

(65) Prior Publication Data

US 2021/0152322 A1    May 20, 2021

Related U.S. Application Data

(63) Continuation of application No. PCT/JP2018/035172, filed on Sep. 21, 2018.

(51) Int. Cl.
*H04L 7/00* (2006.01)

(52) U.S. Cl.
CPC .................. *H04L 7/0008* (2013.01)

(58) Field of Classification Search
CPC ..... H04L 7/0008; H04L 65/40; H04L 3/0641; H04L 3/0667; H04L 12/28
USPC ...................................................... 370/503
See application file for complete search history.

(56) References Cited

U.S. PATENT DOCUMENTS

| 10,284,692 B2 * | 5/2019 | Ichimura .................. G06F 1/12 |
| 10,820,288 B2 | 10/2020 | Li et al. |
| 2010/0098202 A1 | 4/2010 | Lai et al. |
| 2010/0198363 A1 | 8/2010 | Yajima et al. |

(Continued)

FOREIGN PATENT DOCUMENTS

| CN | 105634636 A | 6/2016 |
| JP | 6-21955 A | 1/1994 |

(Continued)

OTHER PUBLICATIONS

U.S. Office Action dated Dec. 15, 2021 for U.S. Appl. No. 17/159,703.

(Continued)

*Primary Examiner* — Kwang B Yao
*Assistant Examiner* — Syed M Bokhari
(74) *Attorney, Agent, or Firm* — Birch, Stewart, Kolasch & Birch, LLP

(57) ABSTRACT

A communication system (500) includes a plurality of communication apparatuses (100) and selects from the plurality of communication apparatuses (100), a grandmaster that is to be a standard of time. A difference calculation unit (110), when receiving a synchronization message that includes time of the grandmaster from the grandmaster, calculates a time difference between the time of the grandmaster and time of the communication apparatus (100). A correction unit (120) changes count speed of a time counter that counts the time of the communication apparatus (100) in a way that the time of the communication apparatus (100) synchronizes with the time of the grandmaster at a time when a time correction period that is specified beforehand elapses, based on the time difference.

10 Claims, 10 Drawing Sheets

(56) References Cited

U.S. PATENT DOCUMENTS

| | | | |
|---|---|---|---|
| 2013/0215910 A1* | 8/2013 | Inomata | H04J 3/0667 370/503 |
| 2014/0028875 A1 | 1/2014 | Hara | |
| 2014/0098706 A1 | 4/2014 | Maruyama et al. | |
| 2016/0013876 A1 | 1/2016 | Zhang et al. | |
| 2016/0149692 A1 | 5/2016 | Kim et al. | |
| 2017/0078038 A1 | 3/2017 | Tashiro et al. | |
| 2018/0062780 A1* | 3/2018 | Shimizu | H04N 21/242 |

FOREIGN PATENT DOCUMENTS

| | | |
|---|---|---|
| JP | 2006-310964 A | 11/2006 |
| JP | 2010-182103 A | 8/2010 |
| JP | 2012-114815 A | 6/2012 |
| JP | 2013-85278 A | 5/2013 |
| JP | 2013-108895 A | 6/2013 |
| JP | 2014-78781 A | 5/2014 |
| JP | 2015-12400 A | 1/2015 |
| JP | 2015-177275 A | 10/2015 |
| JP | 2015-179999 A | 10/2015 |
| JP | 2018-37885 A | 3/2018 |

OTHER PUBLICATIONS

"IEEE Standard for a Precision Clock Synchronization Protocol for Networked Measurement and Control Systems", IEEE Std 1588TM-2008, total 289 pages.
"Timing and Synchronization for Time-Sensitive Applications in Bridged Local Area Networks", IEEE Std 802.1ASTM-2011, total 292 pages.
International Search Report for PCT/JP2018/035172 dated Dec. 4, 2018.
International Search Report for PCT/JP2018/035173 dated Dec. 4, 2018.
International Search Report for PCT/JP2018/035174 dated Dec. 4, 2018.
Office Action dated Jan. 23, 2023 in Co-pending U.S. Appl. No. 17/160,002.

* cited by examiner

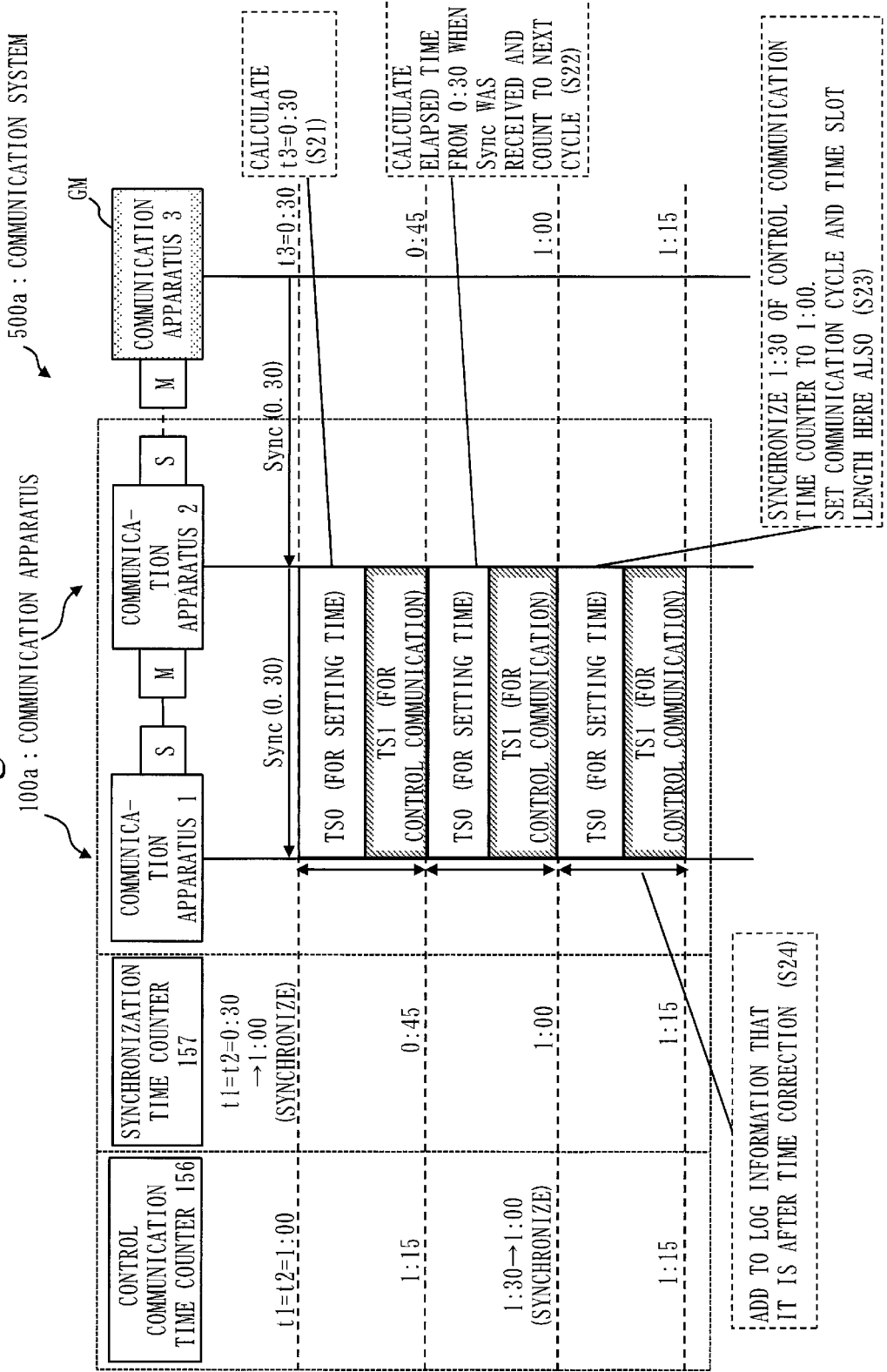

US 11,689,347 B2

COMMUNICATION APPARATUS, COMMUNICATION SYSTEM, COMMUNICATION METHOD, AND COMPUTER READABLE MEDIUM

CROSS REFERENCE TO RELATED APPLICATIONS

This application is a Continuation of PCT International Application No. PCT/JP2018/035172, filed on Sep. 21, 2018, which is hereby expressly incorporated by reference into the present application.

TECHNICAL FIELD

The present invention relates to a communication apparatus, a communication system, a communication method, and a communication program. The present invention relates especially to a communication apparatus, a communication system, a communication method, and a communication program that perform time synchronization on a master-slave system.

BACKGROUND ART

There are standards regarding time synchronization technology such as IEEE1588 or IEEE802.1AS that synchronizes distributed clocks in a network on a master-slave system that is configured of a plurality of nodes. In these standards, a grandmaster which is to be a standard of time is selected based on a Best Master Clock Algorithm (BMCA), and a slave synchronizes with time delivered from the grandmaster. When a node with a higher priority than a priority of the grandmaster newly enters a system that is running, each node performs mediation to select the grandmaster, and recognizes the node with a high priority that has newly entered as the grandmaster. And, each node synchronizes with the node with the high priority that has newly entered. At this time, there is a case where a switch in grandmasters that is unintentional occurs. A process for a selection of a grandmaster by mediation is called "grandmaster mediation".

In the technology of Patent Literature 1, executing time synchronization by making clock frequency of a time slave higher or lower to synchronize with a clock cycle of a time master, is disclosed.

CITATION LIST

Patent Literature

Patent Literature 1: JP 2006-310964 A

SUMMARY OF INVENTION

Technical Problem

In Patent Literature 1, the clock frequency must be physically made higher or lower, and there is a possibility of communication timing of time division communication being disrupted during setting of time.

The present invention aims to provide a communication apparatus that can prevent an occurrence of skipping of time without physically making the clock frequency higher or lower even when synchronizing with a communication apparatus that has newly entered.

Solution to Problem

A communication apparatus according to the present invention is a communication apparatus that is included in a communication system that selects from a plurality of communication apparatuses, a grandmaster that is to be a standard of time of the plurality of communication apparatuses, the communication system including the plurality of communication apparatuses. The communication apparatus includes:

a difference calculation unit, when receiving a synchronization message that includes time of the grandmaster from the grandmaster, to calculate a time difference between the time of the grandmaster and time of the communication apparatus; and a correction unit to change count speed of a time counter that counts the time of the communication apparatus in a way that the time of the communication apparatus synchronizes with the time of the grandmaster at a time when a time correction period that is specified beforehand elapses, based on the time difference.

Advantageous Effects of Invention

According to the communication apparatus of the present invention, an effect is provided where an occurrence of skipping of time can be prevented without physically making the clock frequency higher or lower.

BRIEF DESCRIPTION OF DRAWINGS

FIG. 10 is a diagram illustrating an operation sequence of a communication system according to Embodiment 2.

DESCRIPTION OF EMBODIMENTS

Embodiments of the present invention will be described hereinafter using the drawings. Throughout the drawings, the same or corresponding portions are denoted by the same reference signs. In the description of the embodiments, description of the same or corresponding portions will be suitably omitted or simplified.

Embodiment 1

Figure 1:
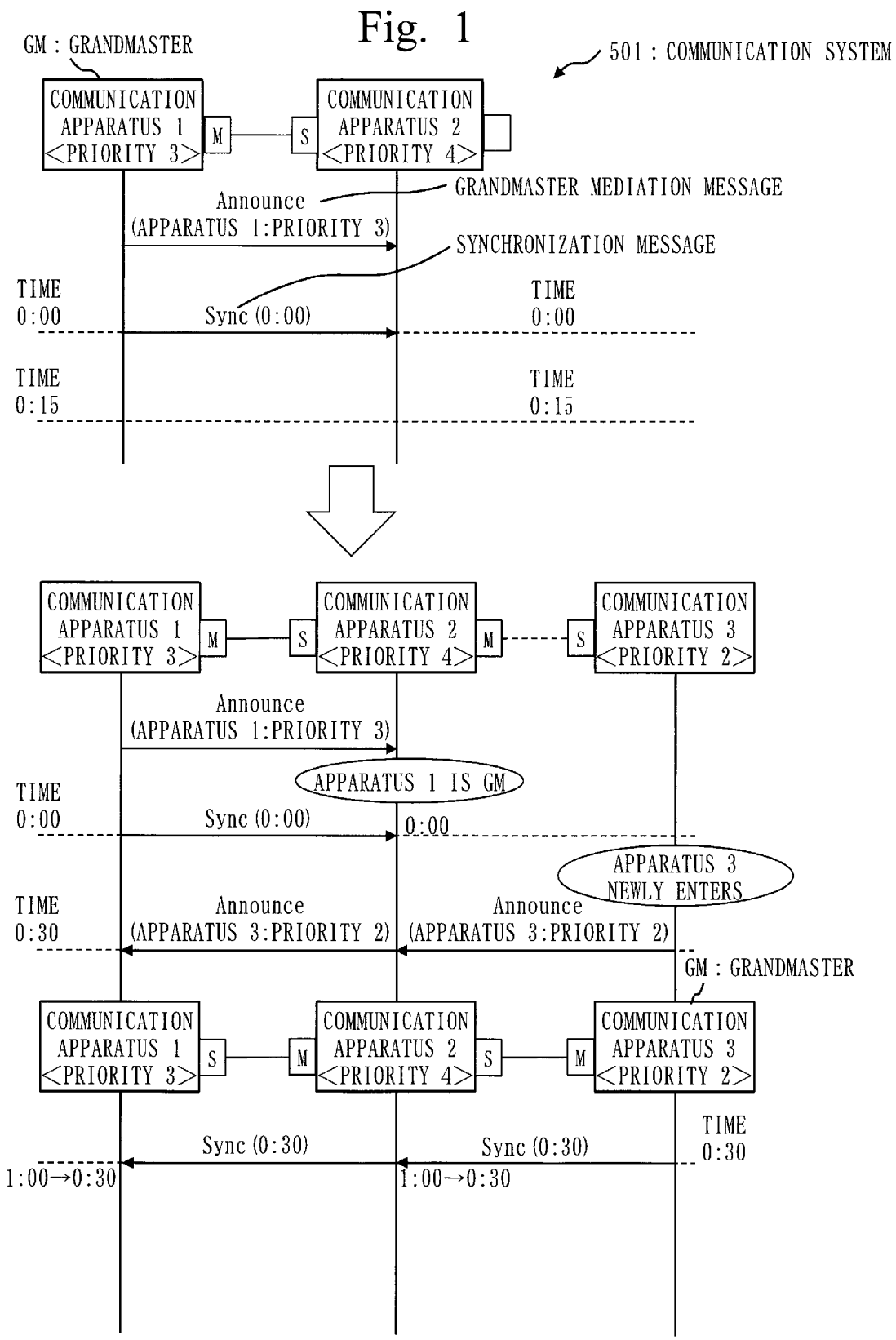
FIG. 1 is a diagram illustrating operation sequences of a communication system to compare with a communication system according to Embodiment 1.

FIG. 1 is a diagram illustrating operation sequences of a communication system 501 to compare with a communication system according to the present embodiment.

The communication system 501 in FIG. 1 and the communication system according to the present embodiment have adopted a standard regarding time synchronization technology such as IEEE1588 or IEEE802.1AS. In these standards a grandmaster is selected by grandmaster mediation using a BMCA, and a slave other than the grandmaster synchronizes with time delivered from the grandmaster.

In the operation sequence in an upper tier in FIG. 1, the communication system 501 includes a communication apparatus 1 of priority 3 and a communication apparatus 2 of priority 4. The communication apparatus 1 is a grandmaster GM that is to be a standard of time of the communication system 501. A grandmaster mediation message Announce is transmitted to the communication apparatus 2 from the communication apparatus 1, and then, a synchronization message Sync is transmitted. As a result, time synchronization of the communication apparatus 1 and the communication apparatus 2 is completed. Hereinafter, there are cases where the grandmaster mediation message Announce is described simply as Announce. There are cases where the synchronization message Sync is described simply as Sync.

The Announce is a frame for performing the grandmaster mediation. The Sync is a frame sent from the grandmaster and is for performing time synchronization of the communication system. In the upper tier in FIG. 1, it is illustrated that the grandmaster mediation is completed, and that the time synchronization has been performed between the communication apparatus 1 and the communication apparatus 2. "M" represents MasterPort. MasterPort is a port that transmits the Announce and the Sync. "S" represents SlavePort. SlavePort is a port that receives the Sync. Here, a value of priority indicates that the smaller the value of priority, the higher a priority is to be the grandmaster.

In the operation sequence in a lower tier in FIG. 1, in a state where the grandmaster mediation of the communication apparatus 1 and the communication apparatus 2 has been completed, a state where a communication apparatus 3 newly enters the communication system 501 is illustrated. The communication apparatus 3 that has newly entered transmits an Announce that indicates that priority 2 of the communication apparatus 3 is higher than priority 3 of the communication apparatus 2 that is the grandmaster, and starts the grandmaster mediation. When the grandmaster mediation is completed, the communication apparatus 3 transmits a Sync to make time of the communication apparatus 1 and the communication apparatus 2 synchronize with time of the communication apparatus 3. As a result, in the communication apparatus 1 and the communication apparatus 2, time skips from 1:00 to 0:30. When the skipping of time occurs as described above, in a control system that executes time division communication, there is a case where communication timing being disrupted. When the skipping of time occurs, there is a case where a context of log information, the log information being collected in the control system that executes the time division communication, is disrupted.

The present embodiment describes of preventing the skipping of time as a result of the communication apparatus 3 that has newly entered becoming the grandmaster, and an aspect of the communication system that does not disrupt the communication timing of the time division communication even during setting of time.

A method to conclude that a communication apparatus is already synchronized with the grandmaster is as follows. When the communication apparatus is a slave, the communication apparatus has SlavePort. When SlavePort is not changed for more than or equal to a certain amount of time, the communication apparatus concludes that the communication apparatus has synchronized with the grandmaster at least once. When the communication apparatus is the grandmaster, a method to conclude that the communication apparatus is already synchronized with the communication apparatus which is the slave is as follows. When the Announce is not received from MasterPort for more than or equal to a certain amount of time, the communication apparatus concludes that the BMCA has ended and the slave is synchronized.

\*\*\*Description of Configuration\*\*\*

A configuration of a communication apparatus 100 according to the present embodiment will be described using FIG. 2.

First, a communication system 500 according to the present embodiment includes a plurality of communication apparatuses 100. In the communication system 500, a communication apparatus of any of a plurality of communication apparatuses is set as the grandmaster that is to be a standard of time of the plurality of communication apparatuses. A communication apparatus of any of the plurality of communication apparatuses is set as a network management master that sets a priority of the grandmaster.

The communication apparatus 100 is a computer. The communication apparatus 100 includes a processor 910 and other hardware such as a memory 921, an auxiliary storage device 922, an input interface 930, an output interface 940, and a communication control unit 950. Furthermore, the communication apparatus 100 includes hardware such as network ports 961 and 962, and a system clock 970. The processor 910 is connected to other hardware via signal lines, and controls these other hardware. Although the network ports 961 and 962, and the system clock 970 are not illustrated in FIG. 2, the network ports 961 and 962, and the system clock 970 will be described using FIG. 3 to be described later.

The communication apparatus 100 includes, as functional elements, a difference calculation unit 110, a correction unit 120, and a mediation unit 130. An apparatus priority 21, a grandmaster priority 22, and a threshold 23 are stored in the memory 921.

Functions of the difference calculation unit 110, the correction unit 120, and the mediation unit 130 are realized by software.

The processor 910 is a device that executes a communication program. The communication program is a program that realizes the functions of the difference calculation unit 110, the correction unit 120, and the mediation unit 130.

The processor 910 is an IC (Integrated Circuit) that performs a calculation process. Specific examples of the processor 910 are a CPU (Central Processing Unit), a DSP (Digital Signal Processor), and a GPU (Graphics Processing Unit).

The memory 921 is a storage device that stores data temporarily. A specific example of the memory 921 is an SRAM (Static Random Access Memory) or a DRAM (Dynamic Random Access Memory).

The auxiliary storage device 922 is a storage device that stores data. A specific example of the auxiliary storage device 922 is an HDD. The auxiliary storage device 922 may be a portable storage medium such as an SD (registered trademark) memory card, a CF, a NAND flash, a flexible disc, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port connected to an input device such as a mouse, a keyboard, or a touch panel. The input interface 930 is, specifically, a USB (Universal Serial Bus) terminal. The input interface 930 may be a port connected to a LAN (Local Area Network).

The output interface 940 is a port to which a cable of an output device such as a display is connected. The output interface 940 is, specifically, a USB terminal or an HDMI (registered trademark) (High Definition Multimedia Interface) terminal. The display is, specifically, an LCD (Liquid Crystal Display).

The communication program is read into the processor 910 and executed by the processor 910. Not only the communication program but also an OS (Operating System) is stored in the memory 921. The processor 910 executes the communication program while executing the OS. The communication program and the OS may be stored in the auxiliary storage device 922. The communication program and the OS stored in the auxiliary storage device 922 are loaded into the memory 921 and executed by the processor 910. A part or all of the communication program may be built into the OS.

The communication apparatus 100 may include a plurality of processors that replace the processor 910. These plurality of processors share execution of the communication program. Each processor is, as with the processor 910, a device that executes the communication program.

Data, information, signal values, and variable values used, processed, or outputted by the communication program are stored in the memory 921, the auxiliary storage device 922, or a register or a cache memory in the processor 910.

"Unit" of each unit of the difference calculation unit 110, the correction unit 120, and the mediation unit 130 may be replaced with "process", "procedure", or "step". "Process" of a difference calculation process, a correction process, and a mediation process may be replaced with "program", "program product", or "computer-readable storage medium having recorded a program".

The communication program makes a computer execute each process, each procedure, or each step being "process", "procedure", or "step" with which "unit" of each unit described above is replaced. A communication method is a method performed by the communication apparatus 100 executing the communication program.

The communication program may be provided being stored in a computer-readable storage medium. The communication program may be provided as a program product.

Figure 2:
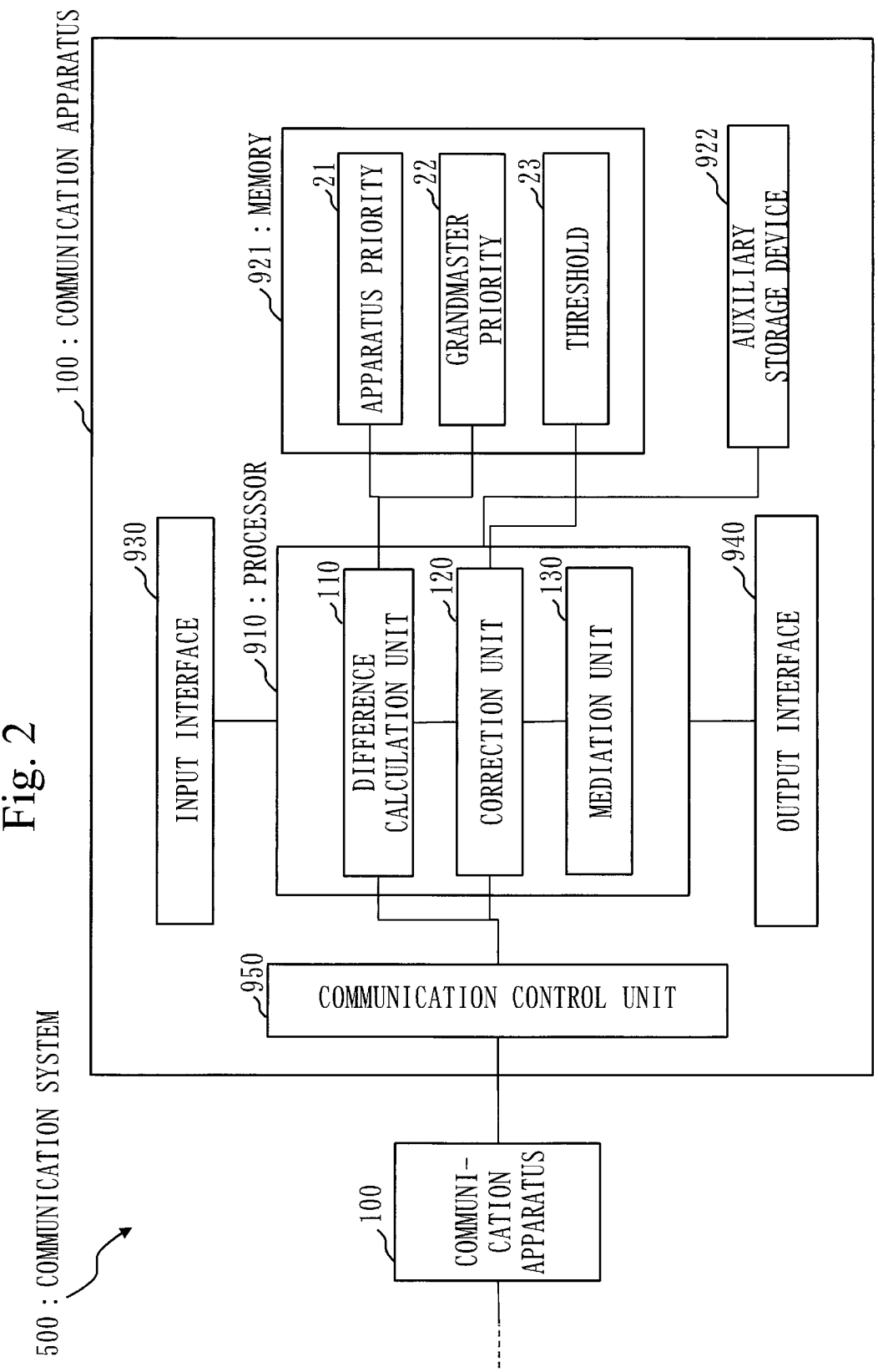
FIG. 2 is a configuration diagram of a communication apparatus according to Embodiment 1.
Figure 3:
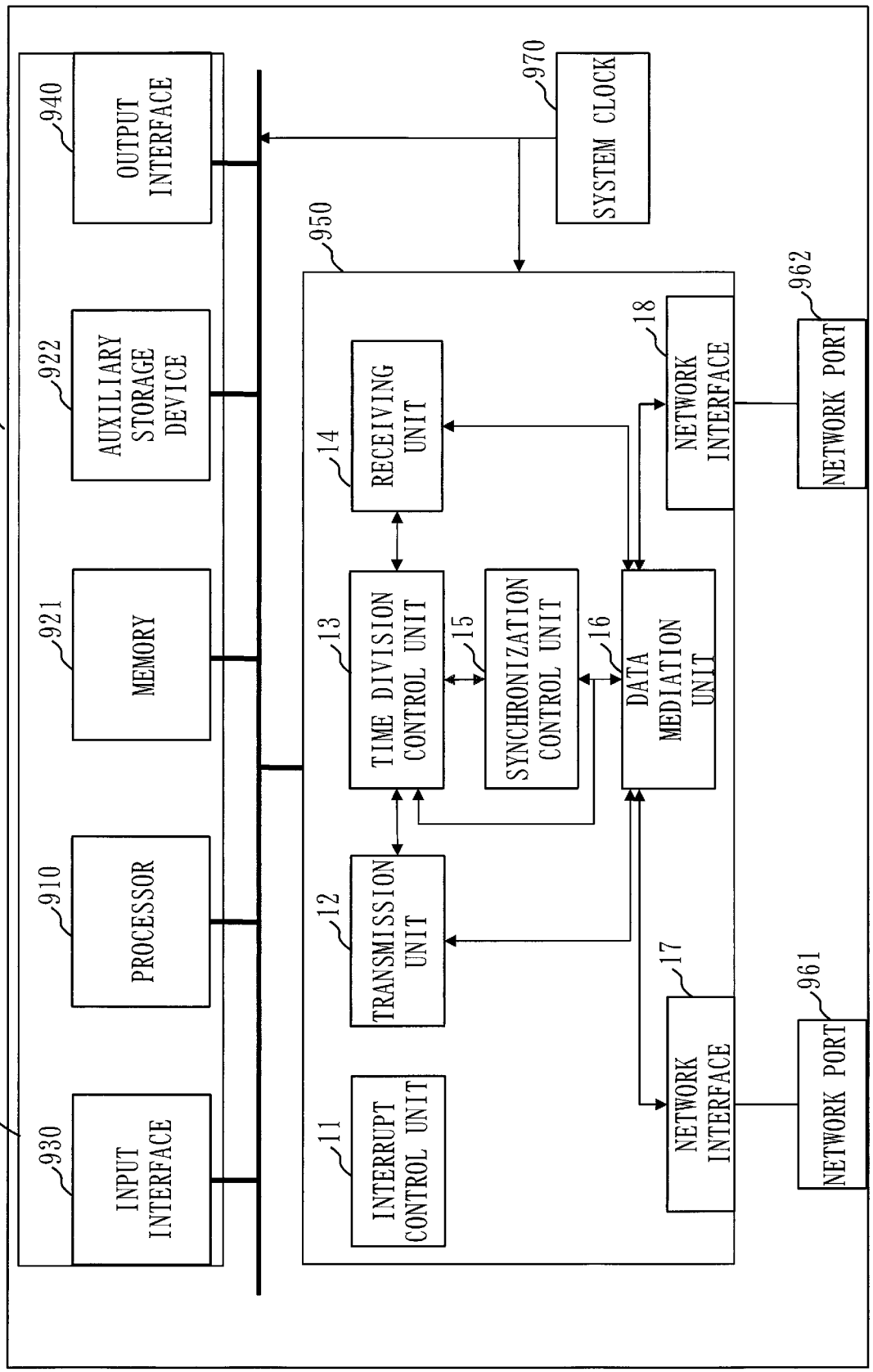
FIG. 3 is a detailed configuration diagram of hardware of the communication apparatus according to Embodiment 1.
Figure 4:
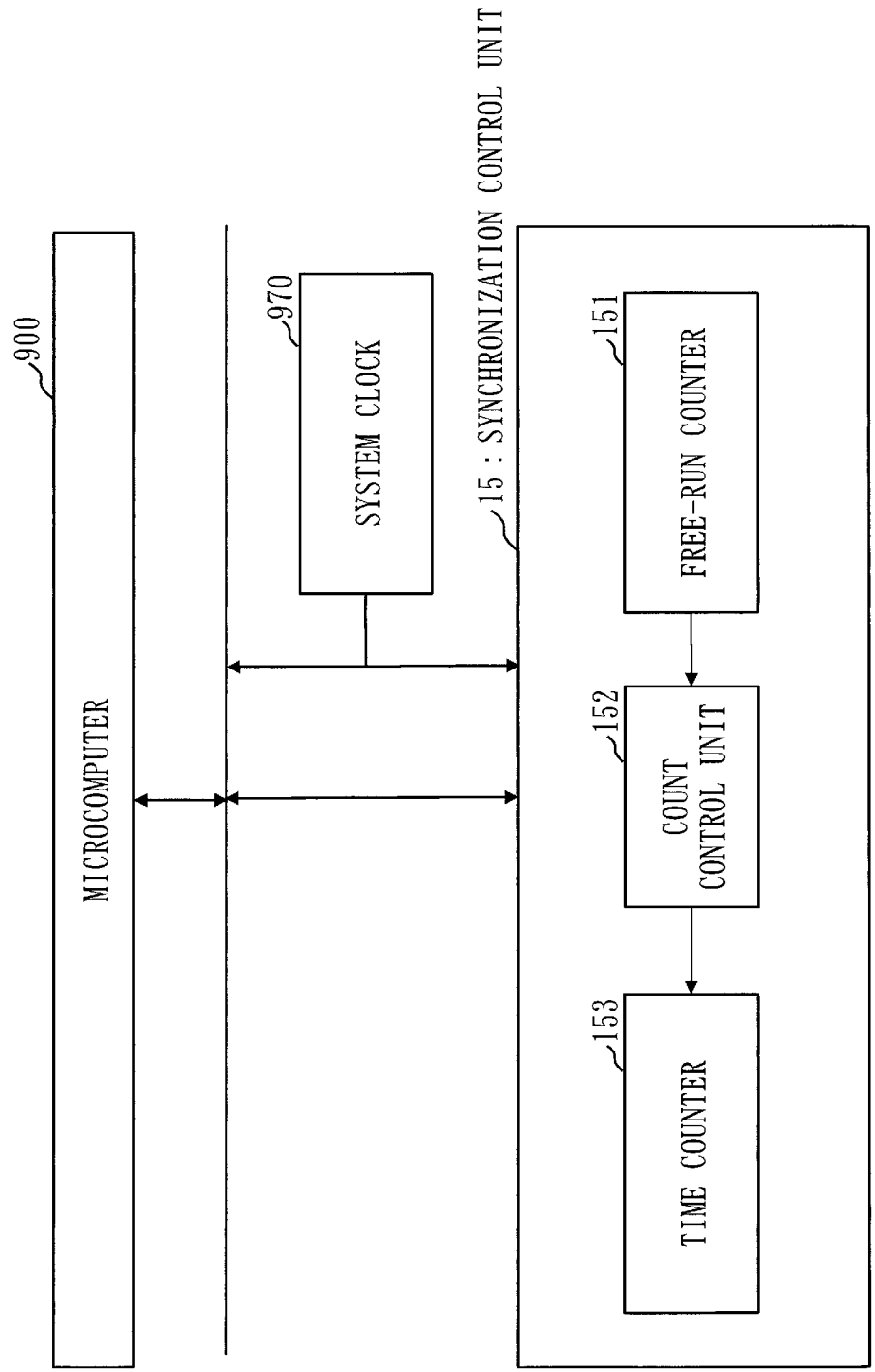
FIG. 4 is a diagram illustrating a detailed configuration of hardware of a synchronization control unit according to Embodiment 1.

FIG. 3 is a diagram illustrating a detailed configuration of hardware of the communication apparatus 100 according to the present embodiment. FIG. 4 is a diagram illustrating a detailed configuration of hardware of a synchronization control unit 15 according to the present embodiment. The hardware described in FIG. 2 will be described in more detail using FIG. 3 and FIG. 4.

The processor 910, the memory 921, the auxiliary storage device 922, the input interface 930, and the output interface 940 are included in a microcomputer 900.

The communication control unit 950 includes an interrupt control unit 11, a transmission unit 12, a time division control unit 13, a receiving unit 14, the synchronization control unit 15, a data mediation unit 16, and network interfaces 17 and 18. The network interface 17 is connected to the network port 961. The network interface 18 is connected to the network port 962.

The interrupt control unit 11 performs outputting of an interrupt to the processor 910 and mask control of an interrupt.

The transmission unit 12 performs generation of a communication frame. Timing is inputted to the transmission unit 12 by the time division control unit 13, and the transmission unit 12 performs control of a start of transmission.

The time division control unit 13 manages a communication cycle and a time slot of the communication apparatus 100. The time division control unit 13 performs control of the communication cycle and the time slot based on time inputted by the synchronization control unit 15. The microcomputer 900 calculates setting values of the communication cycle and a time slot length at a time of time correction. Then, the time division control unit 13 obtains the setting values of the communication cycle and the time slot length calculated by the microcomputer 900, and controls communication timing during time synchronization.

The receiving unit 14 performs a receiving process of a frame. The receiving unit 14 extracts time information from a synchronization frame, that is, a synchronization message.

The synchronization control unit 15 includes a free-run counter 151, a count control unit 152, and a time counter 153. The free-run counter 151 is a counter that counts at regular intervals, for example, at 1 [sec] intervals, and is a counter that is not going to be corrected. The time counter 153 synchronizes with the grandmaster, and counts time of the communication apparatus 100. The free-run counter 151 inputs intervals of time into the time counter 153.

The synchronization control unit 15 performs measurement of time by the free-run counter 151 and the time counter 153. The count control unit 152 obtains a setting value of speed of progress of the time counter 153 from the microcomputer 900. The count control unit 152 adjusts the progress of the time counter 153 based on a count value inputted from the free-run counter 151, and the setting value of speed of progress of the time counter 153. The synchronization control unit 15 outputs a time counter value to the time division control unit 13. The synchronization control unit 15 performs retaining of transmission time and receiving time of the synchronization frame.

The data mediation unit 16 performs transmission mediation of the communication frame. The data mediation unit 16 performs relay control based on time slot information inputted by the time division control unit 13. The data mediation unit 16 performs verification of type of the frame received. The data mediation unit 16 notifies the synchronization control unit 15 of receiving and transmission of the synchronization frame.

The network interfaces 17 and 18 notify the synchronization control unit 15 of the transmission and the receiving of the synchronization frame. The network interfaces 17 and 18 forward to the network ports 961 and 962, a frame to transmit. The network interfaces 17 and 18 forward the frame received from the network ports 961 and 962 to the data mediation unit 16.

The network ports 961 and 962 are physical ports that are connected to a network.

The system clock 970 inputs a clock signal into the communication control unit 950 and an internal bus by an oscillator.

*Description of Operation*

Figure 5:
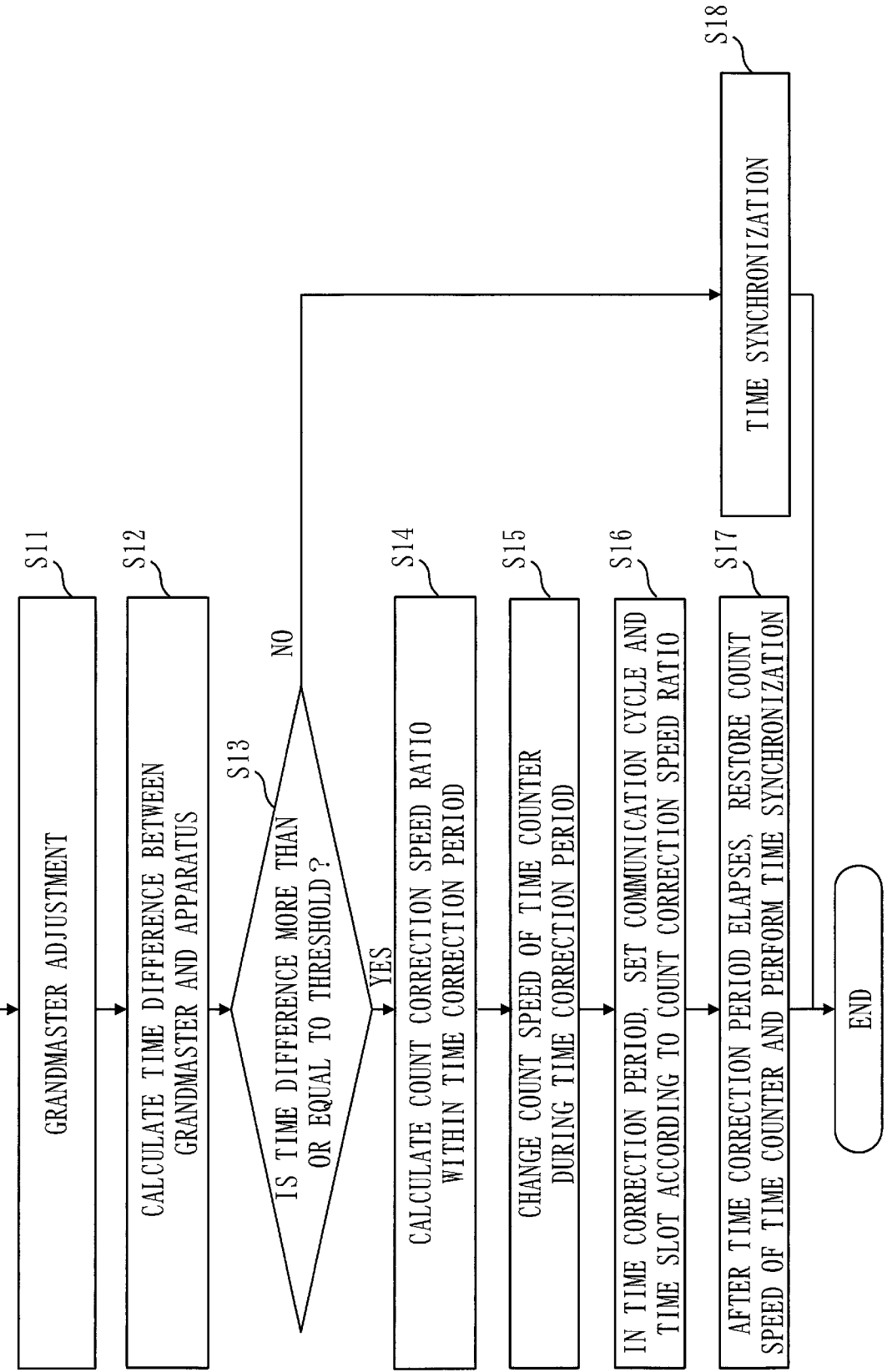
FIG. 5 is a diagram illustrating an operation flow of the communication apparatus according to Embodiment 1.

FIG. 5 is a diagram illustrating an operation flow of the communication apparatus 100 according to the present embodiment.

Figure 6:
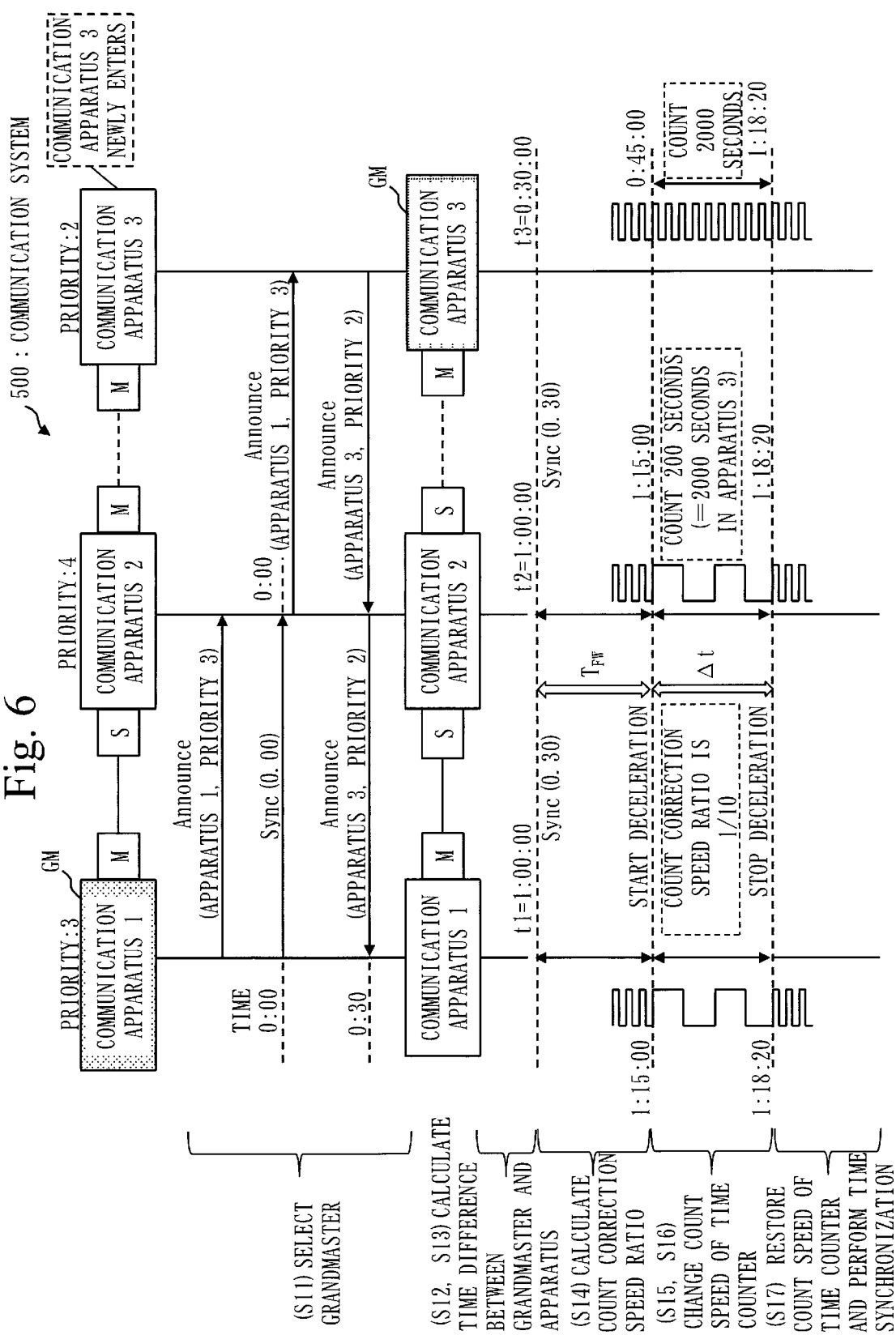
FIG. 6 is a diagram illustrating an operation sequence of the communication system according to Embodiment 1.

FIG. 6 is a diagram illustrating an operation sequence of the communication system 500 according to the present embodiment.

Operation of the communication apparatus 100 of the communication system 500 according to the present embodiment will be described using FIG. 5 and FIG. 6. In FIG. 5 and FIG. 6, step numbers correspond.

In FIG. 6, the communication system 500 includes the plurality of communication apparatuses. The plurality of communication apparatuses are the communication apparatus 1, the communication apparatus 2, and the communication apparatus 3. The communication apparatus 3 is an apparatus that has newly entered the communication system 500. Here, each of the communication apparatus 1 and the communication apparatus 2 will be described as the communication apparatus 100.

In step S11, the communication system 500 executes a grandmaster adjustment. The grandmaster adjustment is performed by the mediation unit 130 of the communication apparatus 100 that the communication system 500 has.

Step S11 in FIG. 6 is a process of the grandmaster mediation where the grandmaster that is to be a standard of time in the communication system 500 is selected. The grandmaster mediation message Announce is transmitted from the communication apparatus 1. The Announce is a message that is used for selecting the grandmaster. In the Announce, a priority of a communication apparatus that is to be a candidate for the grandmaster is included as a parameter. Here, set in Announce is that a priority of the communication apparatus 1 is 3. Then, the synchronization message Sync is transmitted from the communication apparatus 1. Here, since the communication apparatus 2 recognizes the communication apparatus 1 as the grandmaster GM, the communication apparatus 2 synchronizes time with the communication apparatus 1. Next, the communication apparatus 2 transmits to the communication apparatus 3 that newly entered, an Announce including that the priority of the communication apparatus 1 is 3. The communication apparatus 3 transmits an Announce including that a priority of itself, that is, the communication apparatus 3, is 2. When the grandmaster mediation is completed, the communication apparatus 3 with the priority that is highest is selected as the grandmaster GM.

When the communication apparatus 3 is selected as the grandmaster GM, the communication apparatus 100 enters a waiting to receive the synchronization frame Sync state.

In step S12, when the difference calculation unit 110 of the communication apparatus 100 receives a Sync that includes time of the grandmaster from the grandmaster, the difference calculation unit 110 of the communication apparatus 100 calculates a time difference between the time of the grandmaster and the time of the communication apparatus 100. Specifically, the difference calculation unit 110 calculates the time difference between the time of the grandmaster and the time of the communication apparatus 100 based on the Sync delivered from the grandmaster. In the example in FIG. 6, the difference calculation unit 110 of the communication apparatus 100 calculates the time difference as follows, based on the time set in the Sync delivered from the grandmaster GM.

The communication apparatus 1 and the communication apparatus 2 receive the Sync transmitted from the communication apparatus 3 that is the grandmaster GM. Each of the communication apparatus 1 and the communication apparatus 2 finds a time difference between the communication apparatus 3 and each of the communication apparatus 1 and the communication apparatus 2. Let t1 be the time of the communication apparatus 1, t2 be the time of the communication apparatus 2, and t3 be time of the communication apparatus 3.

<Time difference T2 between the communication apparatus 2 and the communication apparatus 3>=t342=0:30−1:00=−30 [min]

<Time difference T1 between the communication apparatus 1 and the communication apparatus 3>=t341=0:30−1:00=−30 [min]

In step S13, the difference calculation unit 110 verifies whether or not an absolute value of the time difference is more than or equal to the threshold 23. In a case where the absolute value of the time difference is more than or equal to the threshold 23, a process proceeds to step S14. The absolute value of the time difference being more than or equal to the threshold 23 means that when synchronized with the time of the grandmaster, there is a possibility of the communication timing or context of a log being disrupted. On the other hand, in a case where the absolute value of the time difference is less than the threshold 23, the process proceeds to step S18. The absolute value of the time difference being less than the threshold 23 means that there is no problem in synchronizing with the time of the grandmaster. Consequently, in step S18, the difference calculation unit 110 synchronizes the time of the communication apparatus 100 with the time of the grandmaster, and ends the process.

In FIG. 6, assume that the threshold 23 is 15 [min]. In this case, absolute values of both the time difference T1 and the time difference T2 are more than the threshold 23. Consequently, the process proceeds to step S14 that is next.

In step S14, the correction unit 120 of the communication apparatus 100 changes count speed of a time counter in a way that the time of the communication apparatus 100 synchronizes with the time of the grandmaster GM at a time when a time correction period Δt that is specified beforehand elapses, based on the time difference.

The correction unit 120 calculates a ratio between number of counts of a time counter within the time correction period Δt and number of counts of a time counter of the grandmaster within the time correction period Δt, as a count correction speed ratio a. The number of counts of the time counter within the time correction period Δt is the number of counts of the time counter for the time of the communication apparatus 100 to synchronize with the time of the grandmaster GM at the time when the time correction period Δt elapses. Then, the correction unit 120 changes the count speed based on the count correction speed ratio a. The correction unit 120 calculates the count correction speed ratio a using waiting time $T_{FW}$ that is from a point in time when the Sync is received until a start of changing the count speed of the time counter, time when the communication apparatus 100 received the Sync, the time correction period Δt, and time when the grandmaster transmitted the Sync. The count correction speed ratio a is used for making the time of the communication apparatus 100 catch up with the time of the grandmaster in the time correction period Δt.

By calculating formula 1 using the waiting time $T_{FW}$, the time t2 when the communication apparatus 2 received the Sync, the time correction period Δt, the time t3 when the grandmaster transmitted the Sync, and propagation delay time D, the correction unit 120 calculates the count correction speed ratio a.

$$t2 + T_{FW} + \Delta t \times a = t3 + T_{FW} + \Delta t + D \quad \text{(Formula 1)}$$

Δt is timed by a free-run counter that the communication apparatus 100 includes. The free-run counter is a counter that always counts at regular intervals and does not synchronize.

D is propagation delay time that is until the Sync is propagated from the grandmaster to the communication apparatus. In FIG. 6, D approximates to 0.

$T_{FW}$ is waiting time from a point in time when the Sync is received until a start of changing the count speed of the time counter. The waiting time $T_{FW}$ is set beforehand in a way that the microcomputer 900 completes calculation of formula 1 described above within the waiting time $T_{FW}$.

A reason for determining beforehand the time correction period Δt is to conclude whether to accelerate or to decelerate the count speed of the time counter depending on the time difference. When the time of the communication apparatus 100 is behind the time of the grandmaster, the time is accelerated. When the time of the communication apparatus 100 is ahead of the time of the grandmaster, the time is decelerated. In the example in FIG. 6, since time 1:00 of the communication apparatus 100 is ahead of time 0:30 of the grandmaster GM, the communication apparatus 100 decelerates the time.

In FIG. 6, assume that Δt=2000 [sec]. Assigning the specific example in FIG. 6 to formula 1 will become what is described hereinafter.

$$1:00+2000 \times a = 0:30+2000+D$$

$$1:00+33:20 \times a = 0:30+33:20$$

$$1:00+2000a = 1:00+200$$

$$a = 1/10$$

In step S15, after $T_{FW}$ elapses from when the Sync is received, the correction unit 120 corrects the time during the time correction period Δt using the count correction speed ratio a calculated in step S14. The correction unit 120 corrects the time by changing the count speed of the time counter using the count correction speed ratio a. The correction unit 120 corrects the time by counting the time counter with speed of current count speed multiplied by the count correction speed ratio a.

In step S16, the correction unit 120 sets a value of the communication cycle of the communication apparatus 100 multiplied by the count correction speed ratio a as a communication cycle in the time correction period Δt. The communication cycle includes a plurality of time slots. The correction unit 120 sets a value of a time slot length of each of the plurality of time slots multiplied by the count correction speed ratio a as a time slot length in the time correction period Δt.

In the example in FIG. 6, after $T_{FW}$ elapses from when the Sync is received, the correction unit 120 makes the count speed of the time counter to the count correction speed ratio 1/10 and counts during the time correction period Δt. That is, when the free-run counter counts to 10, the correction unit 120 counts the time assuming that 1 [sec] has elapsed. A similar calculation is performed in the communication apparatus 1.

In FIG. 6, the communication apparatus 100 starts deceleration of the count speed of the time counter at time 1:15 with $T_{FW}$=15 [min]. The communication apparatus 100 executes count deceleration for, by the free-run counter, a period of Δt=2000 [sec]. At this time, on the control system that is performing time division control, the correction unit 120 sets values of the communication cycle and the time slot length to 1/10 of the values of the communication cycle and the time slot length. When the count deceleration is performed with the speed of the time counter set at 1/10, the communication cycle of the communication apparatus 100 which is the slave becomes longer relative to the communication cycle that the grandmaster recognizes, and there is a risk of the communication timing being off. Therefore, to prevent the communication timing becoming off, the correction unit 120 performs a process to multiply the values of the communication cycle and the time slot length by 1/10 during the time correction period.

In step S17, after the time correction period elapses in the free-run counter, the correction unit 120 restores the count speed of the time counter. In the example in FIG. 6, after 2000 [sec] elapses in the free-run counter, that is, after 200 [sec] elapses in the time counter, the correction unit 120 restores the count speed of the time counter. The communication apparatus 1 and the communication apparatus 2 synchronize with the communication apparatus 3 at time 1:18:20.

Figure 7:
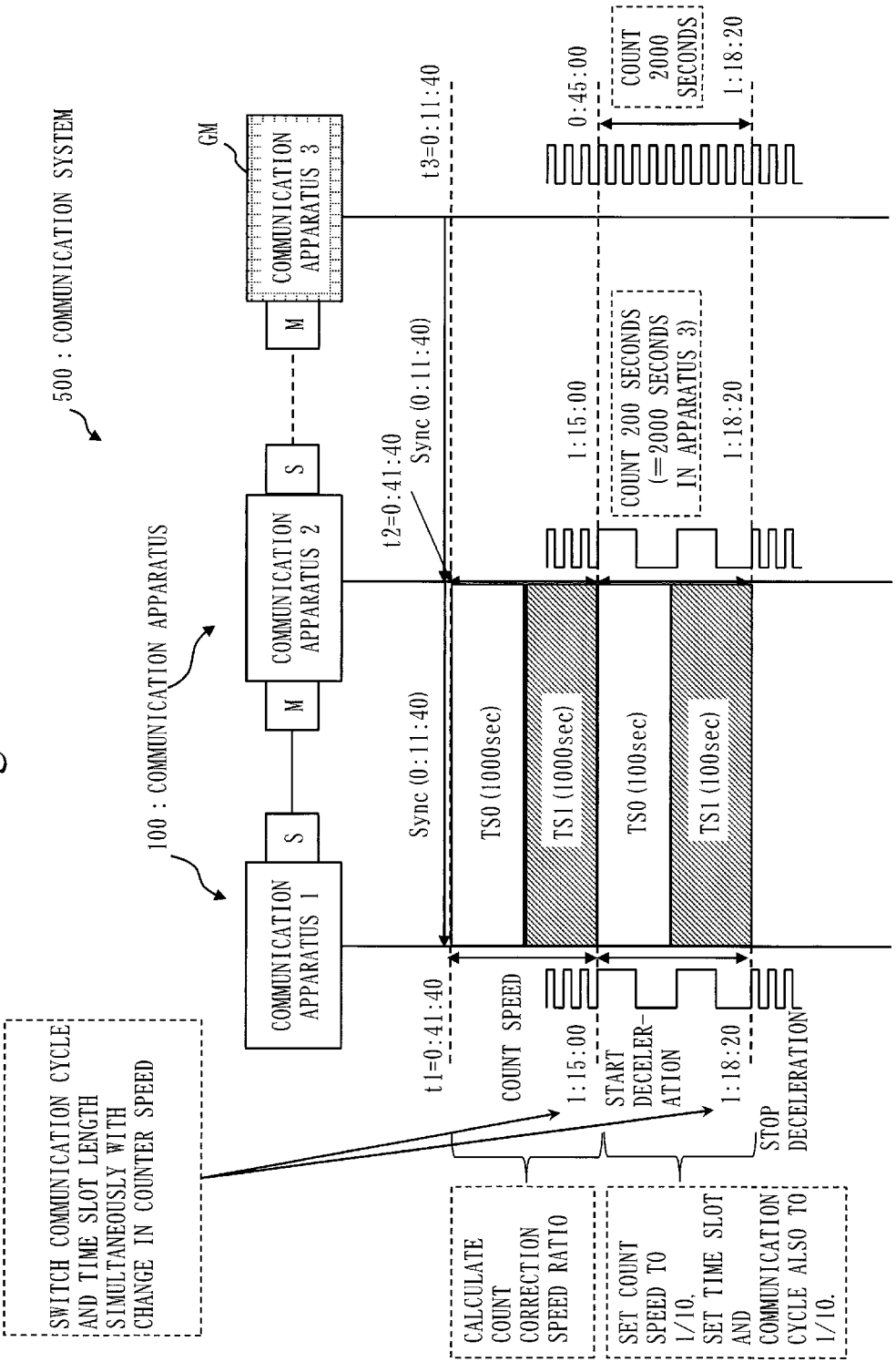
FIG. 7 is a sequence diagram illustrating a multiplication setting of time slots in a correction process according to Embodiment 1.

FIG. 7 is a sequence diagram illustrating a multiplication setting of the time slot in the correction process according to the present embodiment.

In FIG. 7, one communication cycle includes a time setting time slot TS0 and a control communication time slot TS1. The time setting time slot TS0 is a time slot for setting time, that is, for time synchronization. The control communication time slot TS1 is a time slot for control communication where control in the control system, the communication system 500, is executed. In step S14 in FIG. 5, after calculating the count correction speed ratio a, the correction unit 120 may calculate the communication cycle and the time slot length in the time correction period Δt based on the count correction speed ratio a in advance. A process to calculate the communication cycle and the time slot length in advance may be performed by a firmware process. At this time, in step S16, the correction unit 120 changes the communication cycle and the time slot length in the time correction period Δt to values calculated in advance. Specifically, when the count correction speed ratio is 1/10 times, the communication cycle and the time slot length are set to 1/10.

When, however, the communication cycle and the time slot length cannot be changed at discretionary timing, the correction unit 120 sets the time correction period Δt in a way that the time correction period Δt becomes a multiple of the communication cycle. Or, the correction unit 120 sets the time correction period Δt in a way that what is off in the time slot length is within an allowable margin of error. Inability to change the communication cycle and the time slot length at discretionary timing is when timing in which the setting values of the communication cycle and the time slot length are reflected in actual operation is determined. An example is when register values of the communication cycle and the time slot length are read at timing at a start of the communication cycle, and are to be reflected in the actual operation. In such a case, if the time correction period Δt is not set to a multiple of the communication cycle and timing of completion of change and timing of the start of the communication cycle are not the same, there is a risk of timing of the control communication being disrupted. Therefore, the correction unit 120 sets the time correction period Δt in a way that the time correction period Δt is a multiple of the communication cycle.

*Other Configurations*

In the present embodiment, simply, the count speed of the time counter has been changed. Depending on digits, however, the process may be changed. For example, when the time difference between the communication apparatus and the grandmaster is off by units of years, months, and days, a correction unit may immediately correct the time when receiving the Sync. When the time difference is off by units of a few seconds, the correction unit may perform time correction by changing the count speed of the time counter. When the time difference is off by less than or equal to units of milliseconds, the time correction may be made to be performed in the hardware. It is more desirable for formula 1 described above be calculated taking into consideration a crystal deviation correction of a clock, that is, a correction in the amount of a clock frequency ratio and the propagation delay time. It is necessary to design change timing of the communication cycle and the time slot during the time correction period.

In the present embodiment, the functions of the difference calculation unit 110, the correction unit 120, and the mediation unit 130 are realized by software. As a variation, the functions of the difference calculation unit 110, the correction unit 120, and the mediation unit 130 may be realized by hardware.

The communication apparatus 100 may include an electronic circuit in place of the processor 910 in FIG. 2 and FIG. 3. The electronic circuit is a dedicated electronic circuit to realize the functions of the difference calculation unit 110, the correction unit 120, and the mediation unit 130.

The electronic circuit is, specifically, a single circuit, a composite circuit, a programmed processor, a parallel programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the difference calculation unit 110, the correction unit 120, and the mediation unit 130 may be realized by one electronic circuit or may be realized by being distributed to a plurality of electronic circuits.

As another variation, a part of the functions of the difference calculation unit 110, the correction unit 120, and the mediation unit 130 may be realized by the electronic circuit and the rest of the functions may be realized by software.

Each of the processor and the electronic circuit is also called a processing circuitry. That is, in the communication apparatus 100, the functions of the difference calculation unit 110, the correction unit 120, and the mediation unit 130 are realized by the processing circuitry.

DESCRIPTION OF EFFECT OF EMBODIMENT

According to the communication system 500 of the present embodiment, by adjusting an addition/subtraction value of a counter value of the time counter, that is the speed of progress of a count, the time correction becomes possible without making the skipping of time occur.

On the communication system 500 according to the present embodiment, the setting values of the time slot length and the communication cycle are automatically set to a length that is multiplied or divided according to the speed of progress of the count. Consequently, according to the communication system 500 of the present embodiment, the time synchronization can be executed without disrupting the communication timing that is in operation. According to the communication system 500 of the present embodiment, since the skipping of time does not occur, the context of the log information can be maintained.

Embodiment 2

In the present embodiment, parts different from those of Embodiment 1 will mainly be described. There are cases where the same configurations as those of Embodiment 1 are denoted by the same reference signs, and the descriptions being omitted.

*Description of Configuration*

Figure 8:
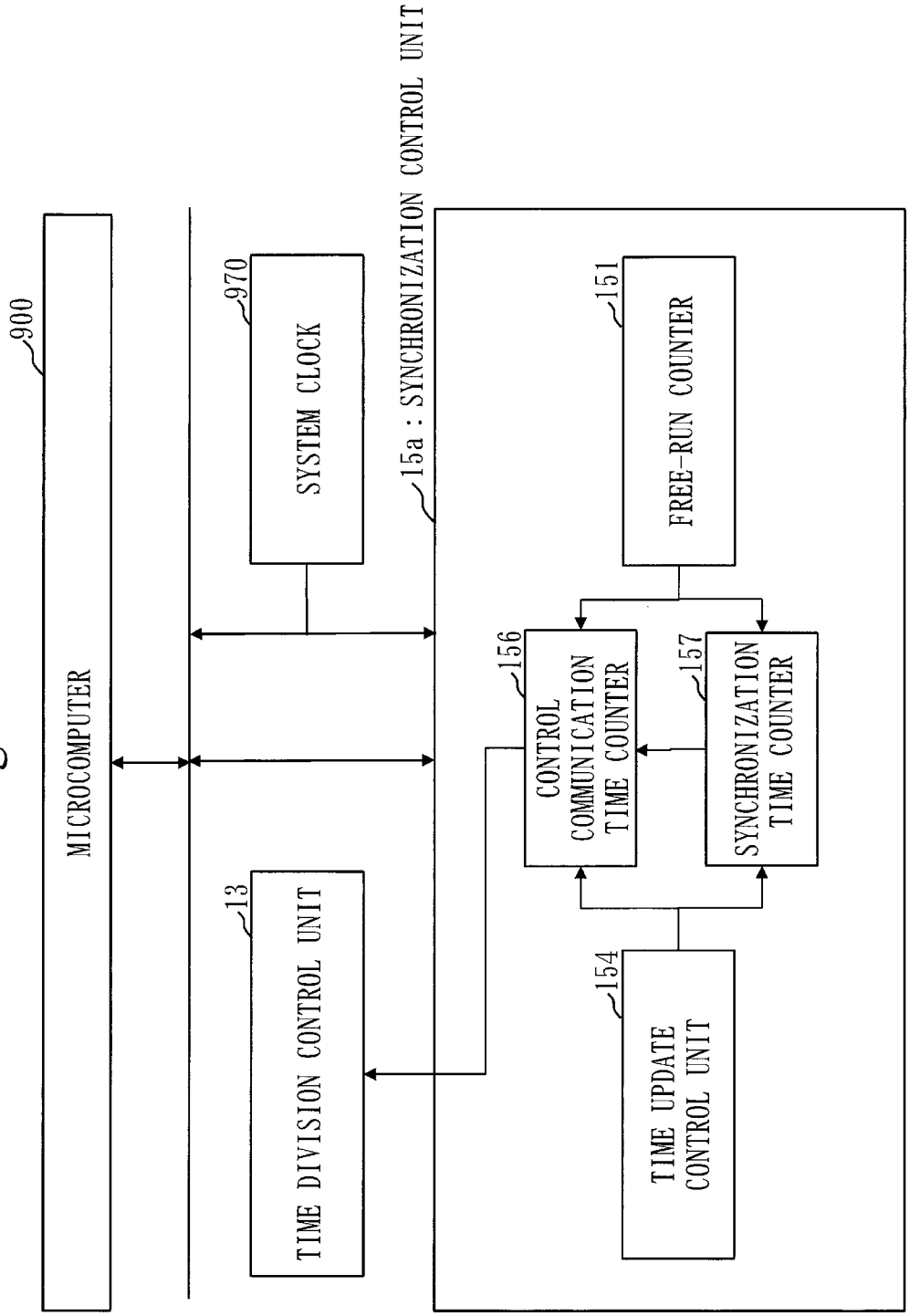
FIG. 8 is a detailed configuration diagram of hardware of a synchronization control unit of a communication apparatus according to Embodiment 2.

FIG. 8 is a diagram illustrating a detailed configuration of hardware of a synchronization control unit 15a of a communication apparatus 100a according to the present embodiment.

In the present embodiment, communication apparatuses of a plurality of communication apparatuses communicate in a communication cycle that includes a time slot where time synchronization is performed, that is, a time slot for time synchronization TS0, and the time slot where the control communication is performed, that is, a time slot for control communication TS1.

The synchronization control unit 15a includes a free-run counter 151, a time update control unit 154, a control communication time counter 156, and a synchronization time counter 157. The control communication time counter 156 counts control communication time to be used in the control communication. The synchronization time counter 157 counts synchronization time to synchronize with the time of the grandmaster. The time division control unit 13 obtains a counter value of the control communication time counter 156, and controls the communication cycle and the time slot length. The time update control unit 154 synchronizes the control communication time counter 156 with the synchronization time counter 157 at timing that does not disrupt the communication cycle and the time slot length. After updating the synchronization time counter 157, the time update control unit 154 calculates synchronization timing of the control communication time counter 156, and notifies the control communication time counter 156 and the synchronization time counter 157 of a start of synchronization. Furthermore, the time update control unit 154 adds to the log information, information for recognizing that the time is updated.

A protocol of the time synchronization is executed in the time slot for time synchronization TS0. And, the synchronization time counter 157 is synchronized with the time of the grandmaster. The control communication time counter 156 performs management of the communication cycle and the time slot length. After completion of synchronization of the synchronization time counter 157, a value of the control communication time counter 156 is synchronized with a value of the synchronization time counter 157 simultaneously with the start of the communication cycle. By this technique, the time synchronization can be executed while maintaining the communication cycle.

The correction unit 120 verifies whether or not there is an influence on the control communication, and when verified that there is no influence on the control communication, the correction unit 120 synchronizes the control communication time counter 156 with the synchronization time counter 157 through the time update control unit 154. The correction unit 120 adds to the log information the information for recognizing that the time has been updated at a time of a time update and attempts not to disrupt the context of the log information.

*Description of Operation*

Figure 9:
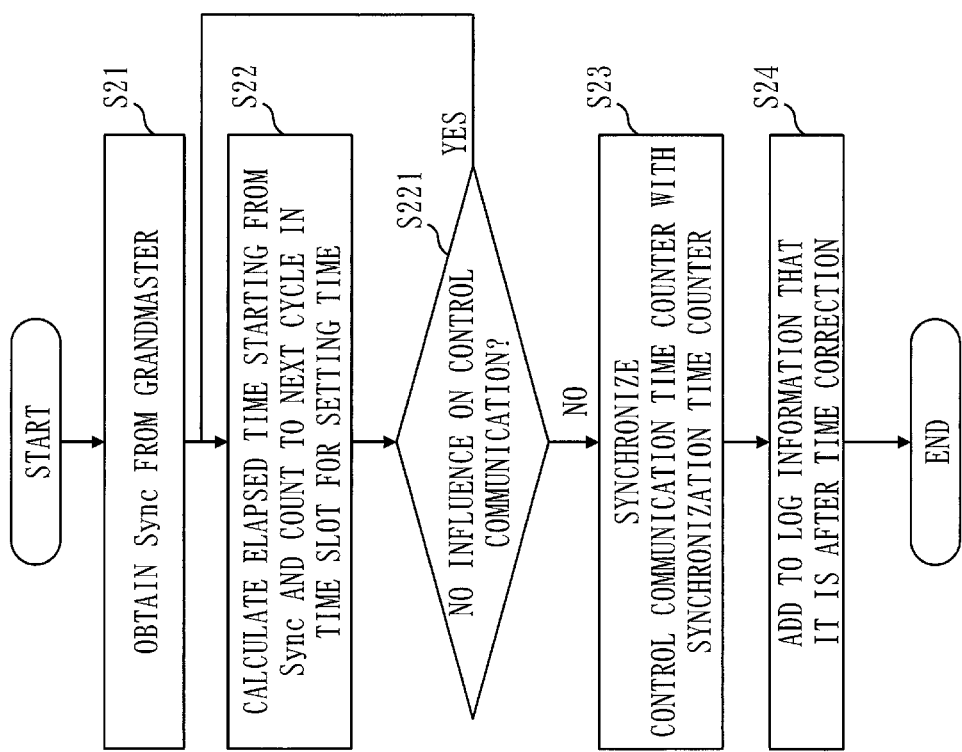
FIG. 9 is a diagram illustrating an operation flow of the communication apparatus according to Embodiment 2.

FIG. 9 is a diagram illustrating an operation flow of the communication apparatus 100a according to the present embodiment.

FIG. 10 is a diagram illustrating an operation sequence of a communication system 500a according to the present embodiment.

Operation of the communication apparatus 100a of the communication system 500a according to the present embodiment will be described using FIG. 9 and FIG. 10. In FIG. 9 and FIG. 10, step numbers correspond.

In FIG. 10, the communication system 500a includes the plurality of communication apparatuses. The plurality of communication apparatuses are a communication apparatus 1, a communication apparatus 2, and a communication apparatus 3. The communication apparatus 3 is an apparatus that has newly entered the communication system 500a. Here, each of the communication apparatus 1 and the communication apparatus 2 will be described as the communication apparatus 100a. In FIG. 10, the communication apparatus 3 is selected as the grandmaster GM.

In step S21, the communication apparatus 3 which is the grandmaster GM transmits the synchronization message Sync. In FIG. 10, at a point in time when the communication apparatus 3 transmits the Sync, the time of the communication apparatus 3 is t3=0:30, and each of the time of the communication apparatus 1 and the communication apparatus 2 is t1=t2=1:00.

When the Sync is received, a correction unit 120 of the communication apparatus 100a synchronizes the synchronization time counter 157 with the grandmaster GM by the time update control unit 154 in the time setting time slot TS0. At this time, the control communication time counter 156 remains having current time. In the example in FIG. 10, the synchronization time counter 157 becomes 0:30 from 1:00. The control communication time counter 156 remains at 1:00. In the example in FIG. 10, assume that the communication cycle is 15 [min].

In step S22, the correction unit 120, in the time setting time slot TS0, calculates by the time update control unit 154, elapsed time from time when the Sync is received, and counts to a next communication cycle. In the example in FIG. 10, the correction unit 120 calculates from 1:00 which is the time when the Sync was received to 1:30 which is start timing of the next communication cycle.

A process of step S22, to set the time by the time of the communication apparatus 3 which is the grandmaster GM, measures a period of 30 minutes from 1:00 which is receiving time of the Sync to 1:30 which is time correction timing. By this measurement of the elapsed time, since Sync transmission time of the communication apparatus 3 is 0:30, when the time correction timing for the communication apparatus 1 and the communication apparatus 2 is 1:30, it can be understood that the time of the communication apparatus 3 is 30 minutes after transmitting the Sync, 1:00.

Next, in step S221, the correction unit 120 verifies whether or not timing is the timing that does not have an influence on the control communication. If verified as the timing that does not have an influence on the control communication, the process proceeds to step S23. If verified as the timing that has an influence on the control communication, the process returns to step S22.

The timing that does not have an influence on the control communication is, for example, timing at a start of the communication cycle. In the example in FIG. 10, timing at a start of the communication cycle two cycles after the time when the Sync was received is set as the timing that does not have an influence on the control communication. Timing to verify that there is no influence on the control communication may be any start timing of the communication cycle.

In step S23, the correction unit 120 synchronizes the control communication time counter 156 with the synchronization time counter 157 by the time update control unit 154 in the time setting time slot TS0 in a next cycle. In the example in FIG. 10, 1:30 of a control communication time counter is overwritten with 1:00.

In step S24, the correction unit 120 adds to the log information that it is after time correction by the time update control unit 154 in the time setting time slot TS0 in a next cycle.

By the communication apparatus 100a according to the present embodiment, two types of time, time before a change and after a change, are retained and the time correction is performed in the time setting time slot TS0. The communication apparatus 100 holds time of both a synchronization time counter and the control communication time counter, and control of the time slot is performed in the control communication time counter. The synchronization time counter is synchronized when in the time setting time slot TS0. The control communication time counter is also corrected at timing immediately after switching the time slots. In the period of the time setting time slot TS0, the communication cycle is adjusted in a way that the communication cycle corresponds to the time after the synchronization.

By providing a time counter for synchronization and a time counter for communication control, synchronizing the time counter for synchronization in a time slot for time synchronization, and to make the time counter for communication control synchronize with the time counter for synchronization simultaneously with a start of a communication cycle, time synchronization can be executed while maintaining the communication cycle and the time slot length.

By retaining number of time updates and associating with the log information, the context of the log information can be maintained even in a case where the skipping of time occurs.

In the Embodiment 1 and 2 above, each unit of the communication apparatus is described as an independent functional block. The configuration of the communication apparatus, however, does not have to be in the configuration as the embodiments described above. The functional block of the communication apparatus may be in any configuration if the functions described in the embodiments described above can be realized. The communication apparatus may be a system configured of a plurality of apparatuses, not of one apparatus.

Of the Embodiments 1 and 2, a plurality of parts may be combined and executed. Or, of these embodiments, one part may be executed. In addition, these embodiments may be combined and executed in any manner, either fully or partially.

That is, in Embodiment 1 and 2, a free combination of the embodiments, a variation of any element in the embodiments, or omitting of any element in the embodiments is possible.

The embodiments described above are essentially preferred examples, and are not intended to limit the scope of the present invention, the scope of application of the present invention, and the scope of use of the present invention. Various changes are possible to be made to the embodiments described above as needed.

REFERENCE SIGNS LIST

11: interrupt control unit; 12: transmission unit; 13: time division control unit; 14: receiving unit; 15, 15a: synchronization control unit; 16: data mediation unit; 17, 18: network interface; 21: apparatus priority; 22: grandmaster priority; 23: threshold; 100, 100a: communication apparatus; 110: difference calculation unit; 120: correction unit; 130: mediation unit; 151: free-run counter; 152: count control unit; 153: time counter; 154: time update control unit; 156: control communication time counter; 157: synchronization time counter; 500, 500a, 501: communication system; 900: microcomputer; 910: processor; 921: memory; 922: auxiliary storage device; 930: input interface; 940: output interface; 950: communication control unit; 961, 962: network port; 970: system clock; a: count correction speed ratio; Announce: grandmaster mediation message; Sync: synchronization message; GM: grandmaster.

The invention claimed is:

1. A communication apparatus that is included in a communication system that selects from a plurality of communication apparatuses, a grandmaster that is to be a standard of time of the plurality of communication apparatuses, the communication system including the plurality of communication apparatuses, the communication apparatus comprising:
a counter circuit configured as a time counter that counts the time of the communication apparatus; and
processing circuitry to:
when receiving a synchronization message that includes time of the grandmaster from the grandmaster, calculate a time difference between the time of the grandmaster and time of the communication apparatus, and
without changing a frequency of the clock signal inputted into the counter circuit, change a count speed of the time counter in a way that the time of the communication apparatus as counted by the time counter synchronizes with the time of the grandmaster at a time when a time correction period that is specified beforehand elapses, based on the time difference, wherein the processing circuitry
calculates, as a count correction speed ratio, a ratio between a count number of the time counter that is the count number of the time counter in the time correction period for the time of the communication apparatus to synchronize with the time of the grandmaster, and a count number of a time counter of the grandmaster in the time correction period, and changes the count speed based on the count correction speed ratio.

2. The communication apparatus according to claim 1, wherein the processing circuitry
verifies whether or not an absolute value of the time difference is more than or equal to a threshold, and
changes the count speed of the time counter when the time difference is more than or equal to the threshold.

3. The communication apparatus according to claim 1, wherein the processing circuitry
calculates the count correction speed ratio by using waiting time that is from a point in time when the synchronization message is received until a start of changing the count speed of the time counter, time when the communication apparatus received the synchronization message, the time correction period, and time when the grandmaster transmitted the synchronization message.

4. The communication apparatus according to claim 3, wherein the processing circuitry
by calculating $t2+T_{Fw}+\Delta t \times a = t3+T_{Fw}+\Delta t+D$ using the waiting time $T_{FW}$ that is from a point in time when the synchronization message is received until a start of changing the count speed of the time counter, the time t2 when the communication apparatus received the synchronization message, the time correction period $\Delta t$, the time t3 when the grandmaster transmitted the synchronization message, and propagation delay time D that is until the synchronization message is propagated from the grandmaster to the communication apparatus, calculates the count correction speed ratio a.

5. The communication apparatus according to claim 1, comprising:
a free-run counter that counts at regular intervals, wherein the time correction period is a period timed by the free-run counter.

6. The communication apparatus according to claim 1, wherein the processing circuitry
sets a value of a communication cycle of the communication apparatus, which is defined according to a frequency of the clock signal, multiplied by the count correction speed ratio as a communication cycle in the time correction period.

7. The communication apparatus according to claim 6, wherein the communication cycle includes a plurality of time slots, and
wherein the processing circuitry
sets a value of each of the plurality of time slots multiplied by the count correction speed ratio as each of a plurality of time slots in the time correction period.

8. A communication system comprising a plurality of communication apparatuses that selects, from the plurality of communication apparatuses, a grandmaster that is to be a standard of time of the plurality of communication apparatuses, wherein
the communication apparatus includes a counter circuit configured as a time counter that counts the time of the communication apparatus, and processing circuitry,
the processing circuitry being configured to
when receiving a synchronization message that includes time of the grandmaster from the grandmaster, calculate a time difference between the time of the grandmaster and time of the communication apparatus, and
without changing a frequency of the clock signal inputted into the counter circuit, change a count speed of the time counter in a way that the time of the communication apparatus as counted by the time counter synchronizes with the time of the grandmaster at a time when a time correction period that is specified beforehand elapses, based on the time difference, wherein processing circuitry
calculates, as a count correction speed ratio, a ratio between a count number of the time counter that is the count number of the time counter in the time correction period for the time of the communication apparatus to synchronize with the time of the grandmaster, and a count number of a time counter of the grandmaster in the time correction period, and changes the count speed based on the count correction speed ratio.

9. A communication method of a communication apparatus that includes a counter circuit configured as a time counter that counts the time of the communication apparatus, the communication apparatus being included in a communication system that selects from a plurality of communication apparatuses, a grandmaster that is to be a standard of time of the plurality of communication apparatuses, the communication system including the plurality of communication apparatuses, the communication method comprising:

when receiving a synchronization message that includes time of the grandmaster from the grandmaster, calculating a time difference between the time of the grandmaster and time of the communication apparatus; and without changing a frequency of the clock signal inputted into the counter circuit, changing count speed of the time counter in a way that the time of the communication apparatus as counted by the time counter synchronizes with the time of the grandmaster at a time when a time correction period that is specified beforehand elapses, based on the time difference, wherein the changing the count speed calculates, as a count correction speed ratio, a ratio between a count number of the time counter that is the count number of the time counter in the time correction period for the time of the communication apparatus to synchronize with the time of the grandmaster, and a count number of a time counter of the grandmaster in the time correction period, and changes the count speed based on the count correction speed ratio.

10. A non-transitory computer readable medium storing a communication program of a communication apparatus that includes a counter circuit configured as a time counter that counts the time of the communication apparatus, the communication apparatus being included in a communication system that selects from a plurality of communication apparatuses, a grandmaster that is to be a standard of time of the plurality of communication apparatuses, the communication system including the plurality of communication apparatuses, the communication program causing a computer to execute:

a difference calculation process, when receiving a synchronization message that includes time of the grandmaster from the grandmaster, to calculate a time difference between the time of the grandmaster and time of the communication apparatus; and a correction process to, without changing a frequency of the clock signal inputted into the counter circuit change a count speed of the time counter in a way that the time of the communication apparatus as counted by the time counter synchronizes with the time of the grandmaster at a time when a time correction period that is specified beforehand elapses, based on the time difference, wherein the correction process calculates, as a count correction speed ratio, a ratio between a count number of the time counter that is the count number of the time counter in the time correction period for the time of the communication apparatus to synchronize with the time of the grandmaster, and a count number of a time counter of the grandmaster in the time correction period, and changes the count speed based on the count correction speed ratio.

* * * * *